United States Patent
Hausmann

(10) Patent No.: US 6,407,172 B1
(45) Date of Patent: Jun. 18, 2002

(54) THERMOPLASTIC POLYMER COMPOSITIONS

(75) Inventor: Karlheinz Hausmann, Auvernier (CH)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/581,955

(22) PCT Filed: Dec. 11, 1998

(86) PCT No.: PCT/US98/26423

§ 371 (c)(1),
(2), (4) Date: Jun. 16, 2000

(87) PCT Pub. No.: WO99/31177

PCT Pub. Date: Jun. 24, 1999

(30) Foreign Application Priority Data

Dec. 18, 1997 (EP) .............................. 97203986

(51) Int. Cl.[7] .......................... C08L 23/10; C08L 23/08; C08L 23/16

(52) U.S. Cl. ....................... 525/191; 525/221; 525/222; 525/227; 525/228; 525/240

(58) Field of Search .................................. 525/191, 221, 525/222, 227, 228, 240

(56) References Cited

U.S. PATENT DOCUMENTS 5,206,294 A  4/1993  Dawson ...................... 525/196

FOREIGN PATENT DOCUMENTS

| CA | 2249001 | 9/1997 |
| DE | 196 10 415 | 9/1997 |
| EP | 0 452 010 | 10/1991 |

OTHER PUBLICATIONS

PCT International Search Report for International application No. PCT/US 98/26423 dated Apr. 15, 1999.

*Primary Examiner*—Nathan M. Nutter

(57) ABSTRACT

A composition suitable for thermoforming which demonstrates good grain retention at thin gauges, low gloss and whose cost is competitive for many applications, particularly in the automotive industry, is described. This composition contains (a) 10–35 wt. % of polypropylene or an ethylene/propylene copolymer, (b) 0–30 wt. % uncrosslinked ethylene propylene copolymer rubber having an ethylene content 60–80 wt. %, (c) 10–25 wt. % of an ionomeric copolymer of ethylene and an $\alpha, \beta$-unsaturated $C_3$–$C_8$ carboxylic acid, (d) 2–6 wt. % of a copolymer of ethylene and glycidyl acrylate or glycidyl methacrylate, (e) 5–20 wt. % polyethylene, and (f) 0–25 wt. % of an ethylene alpha-olefin copolymer elastomer.

9 Claims, No Drawings

THERMOPLASTIC POLYMER COMPOSITIONS

CROSS-REFERENCE TO RELATED APPLICATIONS

This application claims the benefit of priority to European Patent Application 97203986.1 dated Dec. 18, 1987 via corresponding International Application Number PTC/U98/26423 filed Dec. 11, 1998 and published as WO 99/31177 on Jun. 24, 1999.

BACKGROUND OF THE INVENTION

This invention relates to thermoplastic polymer compositions which are thermoformable, and to thermoformed articles made from such compositions.

The compositions of the present invention, which are halogen-free, are useful for making laminates, sheets and films, and for replacing polyvinyl chloride (PVC) resins in many of their traditional uses. In particular, compositions of the present invention, and thermoformed articles made therefrom, are suitable as PVC replacements in the automotive field. They may be used in the fabrication of interior sheathing of automobiles, for example, in the instrument panel skins, door panels, roof liners and seat covers.

Automotive applications require certain properties in the resins, including good flexibility, low temperature properties, capability of providing a soft surface texture and grain retention; as well as good high temperature properties and low emissions associated with it in view of the extreme temperatures the interior of automobiles can reach on hot, sunny days. PVC-free compositions comprising a blend of polypropylene, ethylene copolymer ionomer resin, ethylene/glycidyl acrylate or methacrylate copolymer, and uncrosslinked ethylene propylene rubber are described in U.S. Pat. No. 5,206,294. Such a blend has been proven suitable for most applications and it is characterized by good thermoformability and grain retention. This blend has some drawbacks, however, in applications where thin gauges are required. At gauges around 1 mm and thinner, the low embossing depth may lead to insufficient grain retention; moreover, this blend may be too costly for certain applications.

DE 196 10 415, assigned to Schulman GMBH. discloses compounds for injection molding application. The compositions include a polyolefin, a noncrosslinked ethylone propylene copolymer, an ionomeric copolymer, a carboxylic acid compound and an epoxide compound. The epoxide compound must be of the following formula:

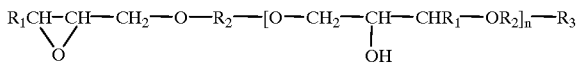

wherein n=0–10, $R_1$=hydrogen, an alkyl, aralkyl or aryl group, and $R_2$ is an alkyl, aralkyl, alkylalkoxy, cycloalkyl, or cycloalkenyl group, and $R_3$ is

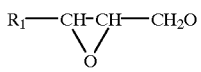

if n is not equal to 0, and $R_3$=hydrogen if n=0.

The epoxide compound may be n-butylglyidyl ether, 2-ethylhexylglycidyl ether, glycidyl ethers of long-chain aliphatic alcohols, among others.

EP 0 452 010 A2 discloses thermoplastic resin compositions, having good toughness and resistance to heat deformation, comprising crystalline propylene polymer, random stytenic copolymer, clastomeric olefin polymer selected from ethylene-propyleno-copolymer, ethylene-propylene-diene terpolymers, etc., and an epoxy group-containing olefinic copolymer.

SUMMARY OF THE INVENTION

The present invention provides a composition suitable for thermoforming which demonstrates good grain retention at thin gauges, low gloss and whose cost is competitive for many applications. This composition contains (a) 10–35 wt. % of polypropylene or an ethylene/propylene copolymer, (b) 0–30 wt. % uncrosslinked ethylene propyleie copolymer rubber having an ethylene content of 60–80 wt. %, (c) 10–25 wt. % of an ionomeric copolymer of ethylene and an α,β-unsaturated $C_3$–$C_8$ carboxylic acid, (d) 2–6 wt. % of a copolymer of ethylene and glycidyl acrylate or glycidyl methacrylate, (e) 5–20 wt. % polyethylene, and (f) 0–25 wt. % of an ethylene alpha-olefin copolymer elastoiner. As such the present invention also provides a thermoforned article made from the above composition and in particular a thermoformed instrument panel skih); including such articles that are laminated to foam prior to thermoforming.

DETAILED DESCRIPTION OF THE INVENTION

Component (a) of the composition may be a polypropylene or an ethylene/propylene copolymer, or a mixture thereof. Where component (a) contains a polypropylene, the polypropylene component consists of crystalline polypropylene and is intended to include in addition to the homopolymer those polymers that also contain minor amounts, usually not greater than 15 wt %, of higher or lower α-olefins, e.g. those containing 3–8 carbon atoms, such as ethylene, butene, octene, etc. The polypropylene polymers useful in this invention have melt indices in the range of from about 0.07–30 g/10 min at 230° C./2.16 kg.

Where component (a) contains an ethylene/propylene copolymer, the copolymer will contain usually more than 15 wt % ethylene. Such polymers are well known to those skilled in the art and are commercially available.

Component (a) is present in the composition of the present invention in amounts of 10–35 wt. %, preferably 20–30 wt. %.

The uncrosslinked ethylene/propylene copolymer rubber (component (b)) may be an ethylene/propylene/nonconjugated diene copolymer (EPDM) or an ethylene/propylene copolymer (EPM). EPDMs are preferred as component (b). The uncrosslinked ethylene/propylene copolymer rubber contains about 60–80 wt. %, usually about 65–75 wt % ethylene.

The nonconjugated dienes can contain from 6–22 carbon atoms having at least one readily polymerizable double bond. The amount of nonconjugated diene is generally from about 1–7 wt. %, usually 2–5 wt. %. EPDM copolymers that are especially preferred are ethylene/propylene/1,4-hexadiene, ethylene/propylene/dicyclopentadiene, ethylene/propylene/norbornene, ethylene/propylene/methylene-2-norbornene and ethylene/propylene/1,4-hexadiene/norbornadiene. It is preferred that the ethylene/propylene copolymer rubber are non-crosslinked. The ethylene/propylene copolymer rubber present as component (a)(ii) in the blend is present in amounts of 15–50 wt. %, preferably 15–40 wt. %.

Component (b) is present in the composition of the present invention in amounts of 0–30 wt. %, preferably 10–30 wt. %.

The ionic copolymer of ethylene and an α,β-unsaturated $C_3$–$C_8$ carboxylic acid (component (c)) optionally contains at least one softening comonomer that is copolymerizable with ethylene. Acrylic and methacrylic acids are preferred acid comonomers. The softening comonomer can be an alkyl acrylate selected from the group consisting of n-propyl-, n-butyl, n-octyl, 2-ethylhexyl-, and 2-methoxethyl-acrylates. The preferred alkyl acrylates are n-butyl-, 2-ethylhexyl-, and 2-methoxyethyl-acrylates. The softening comonomer can also be an alkyl vinyl ether selected from the group consisting of n-butyl, n-hexyl, 2-ethylhexyl-, and 2-methoxyethyl-vinyl ether. The preferred alkyl vinyl ethers are n-butyl vinyl ether and n-hexyl vinyl ether. The copolymer is about 10 to 70% neutralized with metal ions selected from groups Ia, Ib, Ia, IIIa, IVa, VIb, and VIII of the Periodic Table of Elements such as sodium, potassium zinc, calcium, magnesium, lithium, aluminum, nickel, and chrominum. Preferably the copolymer has from about 35 to about 70% of the carboxylic acid groups ionized by neutralization with metal ions selected from the group consisting of sodium, potassium, zinc, calcium, and magnesium. Component (c) is present in the composition of the present invention in amounts of 10–25 wt. %, preferably 15–20 wt. %.

The copolymer of ethylene and glycidyl acrylate or ethylene and glycidyl methacrylate (component (d)) preferably contains copolymerized units of an alkyl acrylate or an alkyl methacrylate having 1-6 carbon atoms. The ethylene/glycidyl acrylate or ethylenel-glycidyl methacrylate copolymer contains 60–88 weight percent ethylene and 1–12 weight percent glycidyl acrylate or glycidyl methacrylate. Representative alkyl acrylates and alkyl methacrylates that are used in the copolymer include methyl acrylate, ethyl acrylate, propyl acrylate, n-butyl acrylate, isobutyl acrylate, hexyl acrylate, methyl methacrylate, ethyl methacrylate, propyl methacrylate, butyl methacrylate, and hexyl methacrylate. Ethyl acrylate is preferred and n-butyl acrylate is especially preferred.

The ethylene/glycidyl (meth)acrylate copolymer can be prepared by direct polymerization, for example, copolymerizing ethylene, an alkyl acrylate, and glycidyl methacrylate or glycidyl acrylate in the presence of a free-radical polymerization initiator at elevated temperatures, generally 100°–230° C., and at elevated pressures, i.e. 140–350 MPa. The most preferred ethylene/glycidyl (methacrylate copolymers that are used in this invention are copolymers of ethylene, ethyl acrylate, glycidyl methacrylate, and, especially, ethylene, n-butyl acrylate, and glycidyl methacrylate. Component (d) is present in the composition of the present invention in amounts of 2–6 wt %, preferably 4–6 wt %.

The polyethylene component (component (e)) is preferably a linear low density polyethylene (LLDPE). LLDPE is a class of low density polyethylene characterized by little, if any, long chain branching, in contrast to conventional LDPE. The processes for producing LLDPE are well known in the art and commercial grades of this polyolefin are available. The term LLDPE means copolymers of ethylene and other alpha-olefins such as 1-butene, 1-hexene, and 1-octene. LLDPEs suitable for the present invention preferably have a melt flow index at 190° C./2.16 kg of less than 1, more preferably less than 0.5. Component (e) is present in the composition of the present invention in amounts of 5–30 wt. %, preferably 10–20 wt %.

The ethylene alpha-olefin copolymer elastomer (component (f)) is a copolymer of ethylene with alpha-olefins having 3–20 carbon atoms, preferably 4–8 carbon atoms (cf. U.S. Pat. Nos. 5,272,236, 5,278,272; PCT WO 94/06817). Alpha-olefins are 1-pentene, 1-hexene, 4-methyl-1-pentene, 1-octene, 1-decene and 1-dodecene, preferably 1-butene, 1-hexen and 1-octene. Component (f) is present in the composition of the present invention in amounts of 0–25 wt %, preferably 15–25 wt %.

The thermoplastic polymer compositions of the present invention are generally prepared by melt blending the polymeric components under high shear conditions, for example in an extruder. The various ingredients may first be combined with one another e.g., in a pellet blend, or they may be combined with one another via simultaneous or separate metering of the various components. They may also be divided and blended in on or more passes into separate sections of the mixing equipment.

The resultant compositions may be thermoformed into a variety of articles, including sheets, or they may be molded into any desired shape. In particular, they may be thermoformed at high deep-draw ratios for use as instrument panel skins for automobiles. In addition, articles may be laminated to a foam prior to thermoforming. These laminates are particularly useful in automotive applications.

Excellent low temperature flexibility and high temperature resistance enables compositions according to the present invention to be useful in applications wherein a wide range of temperature and abrasive conditions are encountered. In addition, as these compositions resist sticking to metal at elevated temperatures, e.g. 150–200° C., they can be used in processes in which hot polymer comes into pressure contact with hot metal rolls.

The invention can be further understood by the following examples in which parts and percentages are by weight unless otherwise indicated.

EXAMPLES

The compositions are compounded in a 25 mm PRISM twin screw extruder. All ingredients were prepared as a salt and pepper blend and granulated after exiting the extruder. The granulate obtained this way is melted in another extruder where 1 mm thick sheets are extruded and are embossed subsequently on an embossing roll. The sheets are then thermoformed over a commercial dashboard form. Grain definition and gloss are compared subjectively.

Components used in the examples are:
1 MOPLEN® 30CS polypropylene homopolymer—melt flow index 8 g/10 min at 230° C. ASTM D-1238, Condition L, made by Montell
2 HIFAX® CA12A polypropylene/ethylene copolymer made by Montell
3 NORDEL® 3681 ethylene/propylene/1,4-hexadiene made by DuPont-Dow Elastomers
4 SURLYN® 9520 zinc ionomer made by DuPont
5 ELVALOY® AS etl>ylene/n-butyl acrylate/glycidyl methacrylate made by DuPont
6 STAMILAN® 2200TC00 polyethylene—MFI=0.3; DSM 1808 polyethylene—MFI=8 made by DSM
ENGAGE® 8150 ethylene-octene copolymer elastomer made by DuPont-Dow Elastomers Elvaloy AS and Surlyn are trade names of E.I. du Pont de Nemours for their polymer modifiers and ionomer resins, respectively Stamilin is a tradename of DSM for their polyethylene resins Engage and Nordel are tradenames of DuPont-Dow Elastomers for their ethylene octene copolymers and their EPDM elastomer resins respectively. Hifax is a tradename of Montell for their polypropylene reactor copolymers Moplen is a tradename of Montell for their polypropylene resins Amounts are given in weight %

|  | Control | 1 | 2 | 3 | 4 | 5 |
|---|---|---|---|---|---|---|
| MOPLEN 30CS | 20 |  |  |  |  | 20 |
| HIFAX CA12A |  | 30 | 30 | 30 | 30 | 10 |
| NORDEL 3681 | 44 | 20 |  |  |  |  |
| ENGAGE 8150 |  | 18 | 28 | 28 | 25 | 25 |
| ELVALOY AS | 2 | 2 | 2 | 2 | 6 | 6 |
| SURLYN 9520 | 34 | 20 | 20 | 20 | 20 | 20 |
| DSM 1808 |  | 10 | 20 |  |  |  |
| STAMILAN 2200TC00 |  |  |  | 20 | 19 | 19 |
| Results |  |  |  |  |  |  |
| MFI | 0.03 | 0.06 | 0.3 | 0.2 | N/A | 0.04 |
| Embossing | poor | good | good | good | good | good |
| Grain retention | v good |  |  |  | best | best |
| Thermoformability | good | poor | poor | fair | fair | fair |
| Gloss | low | high | high | low | lowest | lowest |

The test results indicate that replacing NORDEL rubber in whole or in part with polyethylene improves embossing performance (increases embossing depth) but also increases MFI, which in turn increases undesired gloss. In these cases it is desirable to use a low MFI polyethylene and a high level of crosslinking agent ELVALOY AS in order to obtain a sheet with low gloss, good embossing and low MFI. Thermoforming, however, suffers slightly due to the presence of two different polyolefins (polyethylene and polypropylene) with different melting temperatures.

What is claimed is:

1. A thermoplastic polymer composition comprising
   (a) 10–35 wt. % of polypropylene or an ethylene/propylene copolymer
   (b) 0–30 wt. % uncrosslinked ethylene propylene copolymer rubber having an ethylene content of 60–80 wt. %,
   (c) 10–25 wt. % of an ionomeric copolymer of ethylene and an $\alpha,\beta$-unsaturated $C_3$–$C_8$ carboxylic acid,
   (d) 2–6 wt. % of a copolymer of ethylene and glycidyl acrylate or glycidyl methecrylate,
   (e) 5–20 wt % polyotylene, and
   (f) 0–25 wt. % of an ethylene alpha-olefin copolymer elastomer.

2. A composition according to claim 1 wherein component (a) is polypropylene.

3. A composition according to claim 1 or 2 wherein component (b) is present in an amount of 10–30 wt. %.

4. A composition according to any one of claims 1–3 wherein component (f) is an ethylene-octene copolymer elastomer.

5. A composition according to any one of claims 1–4 wherein component (f) is present in an amount of 15–25 wt. %.

6. A thermoformed article made from a thermoplastic polymer composition comprising:
   (a) 10–35 wt. % of polypropylene or an ethylene/propylene copolymer
   (b) 0–30 wt. % uncrosslinked ethylene propylene copolymer rubber having an ethylene content of 60–80 wt. %,
   (c) 10–25 wt. % of an ionomeric copolymer of ethylene and an $\alpha,\beta$-unsaturated $C_3$–$C_8$ carboxylic acid,
   (d) 2–6 wt. % of a copolymer of ethylene and glycidyl acrylate or glycidyl methacrylate,
   (e) 5–20 wt. % polyethylene, and
   (f) 0–25 wt. % of an ethylene alpha-olefin copolymer elastomer.

7. A thermoformed article according to claim 6 wherein the article is an instrument panel skin.

8. A thermoformed article according to claims 6 or 7 where the article is laminated to a foam prior to thermoforming.

9. A composition according to any one of claims 1–5 wherein component (e) is linear low density polyethylene.

* * * * *

UNITED STATES PATENT AND TRADEMARK OFFICE
CERTIFICATE OF CORRECTION

PATENT NO. : 6,407,172 B1
DATED : June 18, 2002
INVENTOR(S) : Karlheinz Hausmann Page 1 of 1

It is certified that error appears in the above-identified patent and that said Letters Patent is hereby corrected as shown below:

Column 6,
Line 4, delete "polyotylene", add -- polyethylene --.

Signed and Sealed this

Twenty-seventh Day of August, 2002

Attest:

Attesting Officer

JAMES E. ROGAN
Director of the United States Patent and Trademark Office